(12) United States Patent
Yamaguchi et al.

(10) Patent No.: US 11,325,571 B2
(45) Date of Patent: May 10, 2022

(54) VEHICLE CONTROL DEVICE AND MANAGEMENT SYSTEM

(71) Applicant: ISUZU MOTORS LIMITED, Tokyo (JP)

(72) Inventors: Junko Yamaguchi, Fujisawa (JP); Kazutaka Shimoda, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 211 days.

(21) Appl. No.: 16/480,509

(22) PCT Filed: Jan. 23, 2018

(86) PCT No.: PCT/JP2018/001873
§ 371 (c)(1),
(2) Date: Jul. 24, 2019

(87) PCT Pub. No.: WO2018/139423
PCT Pub. Date: Aug. 2, 2018

(65) Prior Publication Data
US 2019/0389441 A1    Dec. 26, 2019

(30) Foreign Application Priority Data
Jan. 24, 2017 (JP) .............................. JP2017-010239

(51) Int. Cl.
*G06F 7/70* (2006.01)
*G06F 19/00* (2018.01)
(Continued)

(52) U.S. Cl.
CPC ............... *B60T 7/22* (2013.01); *B60W 10/18* (2013.01); *B60W 30/0953* (2013.01);
(Continued)

(58) Field of Classification Search
None
See application file for complete search history.

(56) References Cited

U.S. PATENT DOCUMENTS

| | | | |
|---|---|---|---|
| 10,720,080 B1* | 7/2020 | Fields | ............... G07C 5/085 |
| 2004/0085197 A1* | 5/2004 | Watanabe | .......... B60W 40/064 340/435 |

(Continued)

FOREIGN PATENT DOCUMENTS

| | | |
|---|---|---|
| CN | 103229220 A | 7/2013 |
| CN | 104875731 A | 9/2015 |

(Continued)

OTHER PUBLICATIONS

International Search Report and Written Opinion for related International Application No. PCT/JP2018/001873 dated May 1, 2018; English translation of ISR provided; 8 pages.

(Continued)

*Primary Examiner* — Mahmoud S Ismail
(74) *Attorney, Agent, or Firm* — Procopio, Cory, Hargreaves & Savitch LLP (57) ABSTRACT

A vehicle control device includes a braking unit 15 for braking a vehicle, an obstacle detection sensor for detecting an obstacle in front of the vehicle, a braking control unit for controlling a braking of the vehicle by the braking unit on the basis of a detection condition of the obstacle, an acquisition unit for acquiring position information indicating a position of the vehicle, and a storage control unit for storing, in a storage unit, braking history information that includes the position information acquired when the braking of the vehicle is performed by the braking unit under control of the braking control unit.

6 Claims, 4 Drawing Sheets

(51) Int. Cl.
*G06G 7/00* (2006.01)
*G06G 7/76* (2006.01)
*B60T 7/22* (2006.01)
*B60W 10/18* (2012.01)
*B60W 30/095* (2012.01)
*B60W 50/14* (2020.01)
*G08G 1/16* (2006.01)

(52) U.S. Cl.
CPC ............ *B60W 50/14* (2013.01); *G08G 1/166* (2013.01); *B60T 2210/32* (2013.01); *B60W 2050/146* (2013.01); *B60W 2554/00* (2020.02)

(56) References Cited

U.S. PATENT DOCUMENTS

| | | | | |
|---|---|---|---|---|
| 2009/0248231 | A1* | 10/2009 | Kamiya | G05D 1/0061 |
| | | | | 701/23 |
| 2011/0035116 | A1* | 2/2011 | Ieda | G08G 1/166 |
| | | | | 701/45 |
| 2013/0246421 | A1 | 9/2013 | Yamada | |
| 2014/0379233 | A1* | 12/2014 | Chundrlik, Jr. | B60T 7/22 |
| | | | | 701/70 |
| 2015/0283984 | A1* | 10/2015 | Uno | G08G 1/164 |
| | | | | 701/71 |
| 2016/0364921 | A1* | 12/2016 | Iyoda | G07C 5/0841 |
| 2017/0016737 | A1* | 1/2017 | Takahara | G08G 1/096855 |
| 2017/0305440 | A1* | 10/2017 | Oba | B60W 50/08 |
| 2017/0330392 | A1* | 11/2017 | Jordan | G06F 13/14 |
| 2018/0178722 | A1* | 6/2018 | Ohta | B60Q 9/008 |
| 2018/0257644 | A1* | 9/2018 | Morotomi | G05D 1/0246 |
| 2019/0071069 | A1* | 3/2019 | Nordbruch | B60W 30/09 |
| 2019/0071074 | A1* | 3/2019 | Gokan | G06K 9/00805 |
| 2019/0106122 | A1 | 4/2019 | Oba | |
| 2019/0333398 | A1* | 10/2019 | Schupp | G01S 13/933 |
| 2020/0057436 | A1* | 2/2020 | Boda | G05D 1/0022 |

FOREIGN PATENT DOCUMENTS

| | | |
|---|---|---|
| CN | 106297290 A | 1/2017 |
| JP | 2009-029343 A | 2/2009 |
| JP | 2010003086 A | 1/2010 |
| JP | 2013069247 A | 4/2013 |
| JP | 2014-146121 A | 8/2014 |
| JP | 2015-075791 A | 4/2015 |
| JP | 2015097051 A | 5/2015 |
| JP | 2016-115023 A | 6/2016 |
| JP | 2017-004445 A | 1/2017 |

OTHER PUBLICATIONS

First Office Action for related CN App No. 201880007894.3 dated Apr. 28, 2021, 22 pages.

* cited by examiner

VEHICLE CONTROL DEVICE AND MANAGEMENT SYSTEM

CROSS-REFERENCE TO RELATED APPLICATIONS

This application is a U.S. National Stage entry of PCT Application No: PCT/JP2018/001873 filed on Jan. 23, 2018, which claims priority to Japanese Patent Application No. 2017-010239, filed Jan. 24, 2017, the contents of which are incorporated herein by reference.

TECHNICAL FIELD

The present disclosure relates to a vehicle control device and a management system.

BACKGROUND ART

There is known a vehicle control device that avoids a collision with an obstacle or reduces damage due to the collision with the obstacle by automatically applying a brake when the vehicle detects an obstacle and the possibility of the collision with the obstacle is high. Such a vehicle control device records an automatic brake that has been performed as a vehicle operation record (for example, see Patent Literature 1).

CITATION LIST

Patent Document

Patent Literature 1: JP-A-2016-115023

SUMMARY OF THE INVENTION

Technical Problem

In the vehicle control device disclosed in Patent Literature 1 as described above, it is disclosed that an automatic brake that has been performed is recorded as a vehicle operation record, but a manager or a driver of the vehicle cannot grasp a position where the automatic brake is performed.

An object of the present disclosure is to provide a vehicle control device and a management system capable of grasping a position where a brake of a vehicle is performed by control based on a detection condition of an obstacle.

Solution to Problem

A vehicle control device of the present disclosure includes: a braking unit configured to brake a vehicle; an obstacle detection unit configured to detect an obstacle in front of the vehicle; a braking control unit configured to control a brake of the vehicle by the braking unit based on a detection condition of the obstacle; an acquisition unit configured to acquire position information indicating a position of the vehicle; and a storage control unit configured to store, in a storage unit, braking history information that includes the position information acquired when the brake of the vehicle is performed by the braking unit under control of the braking control unit.

The vehicle control device may further include a communication unit configured to communicate with an external device including the storage unit, in which the storage control unit stores the braking history information to the storage unit via the communication unit.

The vehicle control device may further include a traveling speed measurement unit configured to measure a travelling speed of the vehicle, in which the storage control unit stores, in the storage unit, the braking history information that further includes information indicating the travelling speed.

The obstacle detection unit may calculate a time to collision indicating a time until the vehicle collides with the obstacle, and the storage control unit may store, in the storage unit, the braking history information further including information indicating the time to collision.

The vehicle control device may further include a display control unit configured to display information indicating a position where the vehicle is braked on a map displayed on a display unit, based on the position information included in the braking history information stored in the storage unit.

The braking control unit may control the braking unit to apply an alarm brake in a case where the time to collision is less than a first time, and control the braking unit to apply an emergency brake in a case where the time to collision is less than a second time which is shorter than the first time, and the vehicle control device may further include a display control unit configured to display information indicating a position where the emergency brake is applied on a map displayed on a display unit, based on the position information included in the braking history information stored in the storage unit.

A management system of the present disclosure includes: a vehicle control device mounted on each of a plurality of vehicles; and a management device capable of communicating with the vehicle control device, in which the management device includes a storage unit, and the vehicle control device includes: a braking unit configured to brake a vehicle mounting the vehicle control device; an obstacle detection unit configured to detect an obstacle in front of the vehicle; a braking control unit configured to control a brake of the vehicle by the braking unit based on a detection condition of the obstacle; an acquisition unit configured to acquire position information indicating a position of the vehicle; and a storage control unit configured to store, in the storage unit, braking history information that includes the position information acquired when the brake of the vehicle is performed by the braking unit under control of the braking control unit.

The management device may further include a display control unit configured to display information indicating a position where the vehicle is braked on a map displayed on a display unit provided in the vehicle or the management device, based on the position information included in the braking history information stored in the storage unit.

The obstacle detection unit may calculate a time to collision indicating a time until the vehicle collides with the obstacle, the storage control unit may store, in the storage unit, the braking history information that further includes information indicating the time to collision, the braking control unit may control the braking unit to apply an alarm brake in a case where the time to collision is less than a first time, and control the braking unit to apply an emergency brake in a case where the time to collision is less than a second time which is shorter than the first time; and the management device may further include a display control unit configured to display information indicating a position where the emergency brake is applied on a map displayed on a display unit provided in the vehicle or the management device, based on the position information included in the braking history information stored in the storage unit.

Advantageous Effects of the Invention

According to the vehicle control device and the management system of the present disclosure, a position where a brake of a vehicle is performed by control based on a detection condition of an obstacle can be grasped by an operator of the management device or a driver of the vehicle.

DESCRIPTION OF EMBODIMENTS

[Outline of Management System S]

Figure 1:
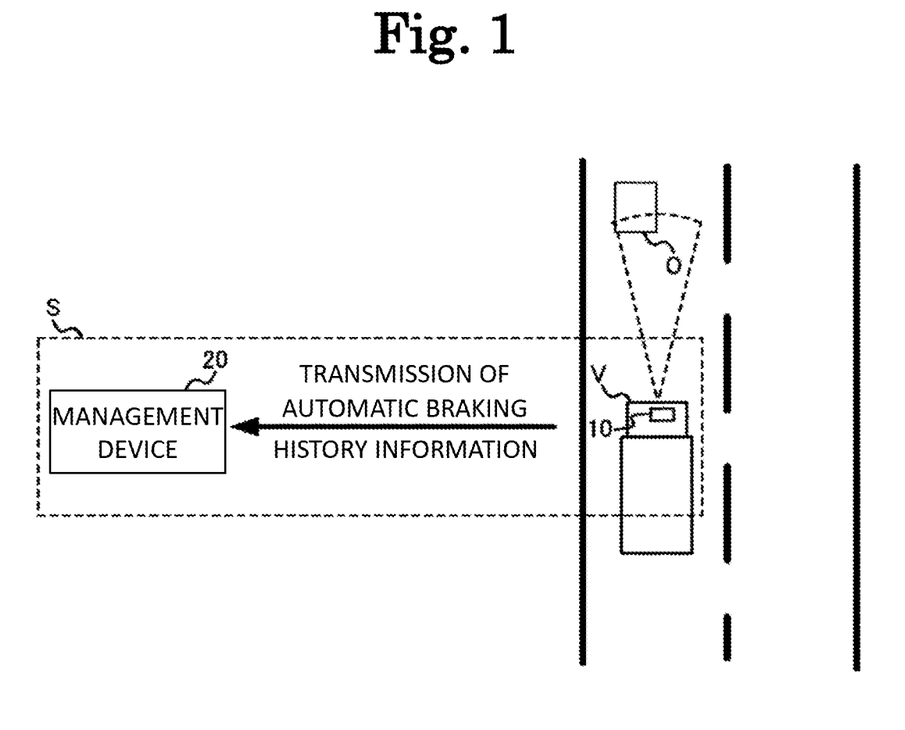
FIG. 1 is a diagram illustrating an outline of a management system according to an embodiment.

FIG. 1 is a diagram for illustrating an outline of a management system S according to an embodiment. The management system S is, for example, a system for managing a position where an automatic brake that automatically brakes a vehicle V is performed in a large vehicle V such as a bus or a truck. The management system S includes a vehicle control device 10 mounted on the vehicle V, and a management device 20 capable of communicating with the vehicle control device 10. Only one vehicle V is shown in FIG. 1, but the present disclosure is not limited thereto, and there may be a plurality of vehicles V provided with the vehicle control device 10.

The vehicle control device 10 determines whether an obstacle O is in front of the vehicle V when the vehicle V is traveling. When the obstacle O is detected and it is determined that the possibility of the vehicle V colliding with the obstacle O is high, the vehicle control device 10 applies an automatic brake that automatically brakes the vehicle V, so as to prevent the vehicle V from colliding with the obstacle O. The vehicle control device 10 transmits, to the management device 20, automatic braking history information including position information indicating a position of the vehicle V acquired when the automatic brake is performed, and stores the automatic braking history information in a storage unit of the management device 20. Therefore, the management device 20 can grasp the position at which the automatic brake is performed in the vehicle V based on the automatic braking history information.

Next, configurations of the vehicle control device 10 and the management device 20 will be described. In the following description, an automatic brake that is performed due to the high possibility of the vehicle V colliding with an obstacle is referred to as a "pre-crash brake".

[Configuration of Vehicle Control Device 10]

Figure 2:
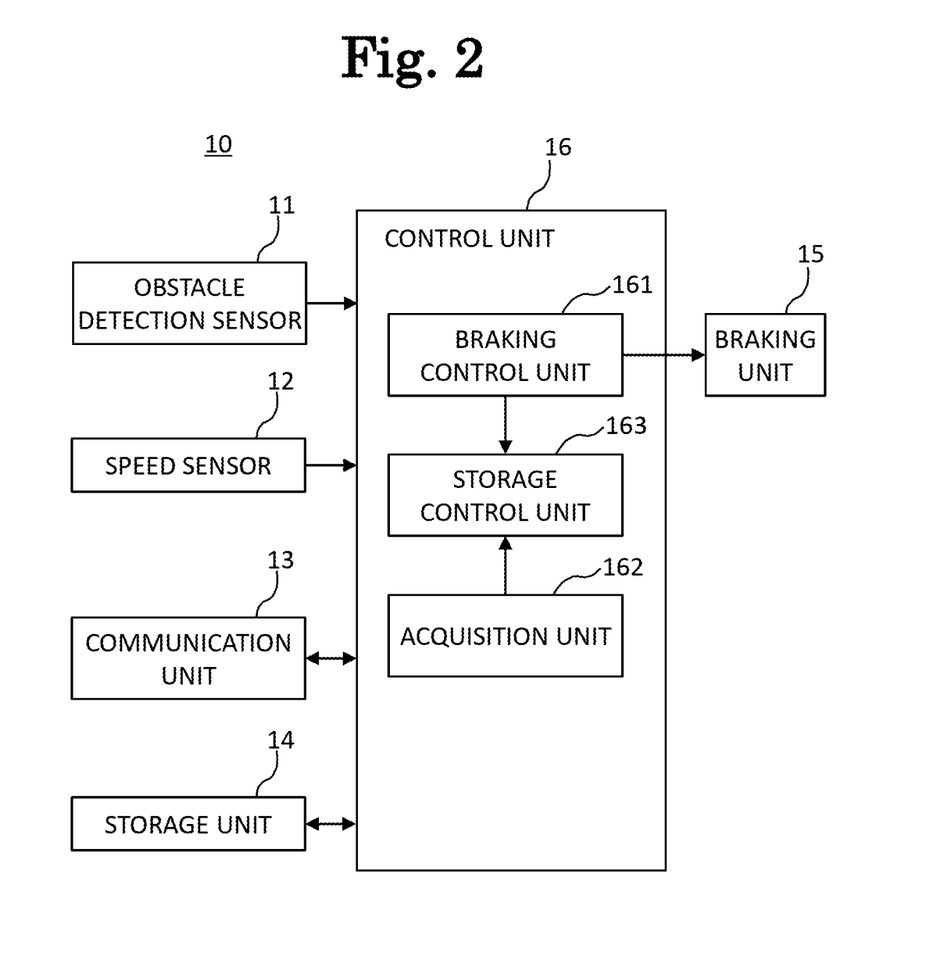
FIG. 2 is a diagram illustrating the configuration of a vehicle control device according to the embodiment.

Next, the configuration of the vehicle control device 10 will be described. FIG. 2 is a diagram illustrating the configuration of the vehicle control device 10 according to the present embodiment.

As shown in FIG. 2, the vehicle V includes an obstacle detection sensor 11 as an obstacle detection unit, a speed sensor 12 as a traveling speed measurement unit, a communication unit 13, a storage unit 14, a braking unit 15, and a control unit 16.

The obstacle detection sensor 11 is, for example, a millimeter wave radar. The obstacle detection sensor 11 irradiates the front of the vehicle V with a millimeter wave, and receives a millimeter wave (reflected wave) reflected by the obstacle O in front of the vehicle V, so as to detect the obstacle O. Here, the obstacle O is, for example, a preceding vehicle traveling in front of the vehicle V, or an intruding vehicle or person intruded in front of the vehicle V.

The obstacle detection sensor 11 measures a relative speed between the vehicle V and the obstacle O based on the frequency of the millimeter wave for irradiation and the frequency of the received reflected wave. The obstacle detection sensor 11 measures a distance between the vehicle V and the obstacle O based on a time from the irradiation with the millimeter wave to the reception of the reflected wave. The obstacle detection sensor 11 calculates a time to collision indicating the time until the vehicle V collides with the obstacle O based on the detected relative speed and distance. The obstacle detection sensor 11 outputs, to the control unit 16, relative speed information indicating the measured relative speed, distance information indicating the measured distance, and information on time to collision indicating the calculated time to collision.

The speed sensor 12 measures a travelling speed of the vehicle V. The speed sensor 12 outputs travelling speed information indicating the measured travelling speed to the control unit 16.

The communication unit 13 communicates with the management device 20 via various communication networks such as a cellular phone network.

The storage unit 14 is, for example, a read only memory (ROM), a Random Access Memory (RAM), or a hard disk. The storage unit 14 stores various programs for enabling the control unit 16 to function. The storage unit 14 stores vehicle control programs for enabling the control unit 16 to function as a braking control unit 161, an acquisition unit 162, and a storage control unit 163.

The braking unit 15 is, for example, a brake provided on a wheel of the vehicle V. The braking unit 15 brakes the vehicle V. Specifically, the braking unit 15 is provided on each of the plurality of wheels of the vehicle V, and applies a braking force to at least one of the plurality of wheels according to the control of the control unit 16.

The control unit 16 is, for example, a central processing unit (CPU). The control unit 16 functions as the braking control unit 161, the acquisition unit 162, and the storage control unit 163 by running the vehicle control programs stored in the storage unit 14.

The braking control unit 161 applies a pre-crash brake that makes the braking unit 15 to brake the vehicle V based on a detection condition of the obstacle O. Specifically, first, the braking control unit 161 acquires the information on time to collision output from the obstacle detection sensor 11. Then, in a case where a time to collision indicated by the information on time to collision is less than a first time, the braking control unit 161 applies the pre-crash brake to prevent the collision of the vehicle V with the obstacle O and to notify the driver that the obstacle O is approaching the vehicle V. Here, the pre-crash brake performed in a case where the time to collision is less than the first time is called "alarm brake".

Further, in a case where a time to collision indicated by the information on time to collision is less than a second time which is shorter than the first time, the braking control unit 161 applies the pre-crash brake to prevent the collision of the vehicle V with the obstacle O. Here, the pre-crash brake performed in a case where the time to collision is less than the second time is called "emergency brake". A braking force of the emergency brake is larger than a braking force of the alarm brake.

The acquisition unit 162 acquires the position information indicating a position of the vehicle V. For example, the acquisition unit 162 acquires position information of the vehicle V based on a radio wave signal received from a global positioning system (GPS) satellite (not shown). The position information includes, for example, latitude information indicating a latitude and longitude information indicating a longitude. The storage unit 14 stores vehicle identification information for identifying the vehicle V, and the acquisition unit 162 acquires the vehicle identification information stored in the storage unit 14.

The storage control unit 163 stores, in the storage unit of the management device 20, the automatic braking history information including the position information acquired by the acquisition unit 162 when the vehicle V is braked by the braking unit 15 under the control of the braking control unit 161, that is, when the pre-crash brake is applied. Specifically, the storage control unit 163 generates the automatic braking history information including time information indicating a time point when the pre-crash brake is applied, position information acquired when the pre-crash brake is applied, the information on time to collision output from the obstacle detection sensor 11, the travelling speed information output from the speed sensor 12, the vehicle identification information, and a type of the pre-crash brake. The storage control unit 163 stores, in the storage unit of the management device 20, the automatic braking history information by transmitting the generated automatic braking history information to the management device 20 via the communication unit 13.

The storage control unit 163 may include information different from the above-described information in the automatic braking history information. For example, the storage control unit 163 may include at least one of a vehicle type of the vehicle V, an opening degree of an accelerator in the vehicle V, an operating condition (brake pedal force) of the braking unit 15 by the driver of the vehicle V, a steering angle, a relative speed and distance with the obstacle O detected by the obstacle detection sensor 11, and information indicating whether or not rollover alarm information indicating that the vehicle V is likely to rollover is generated in the automatic braking history information.

[Configuration of Management Device 20]

Figure 3:
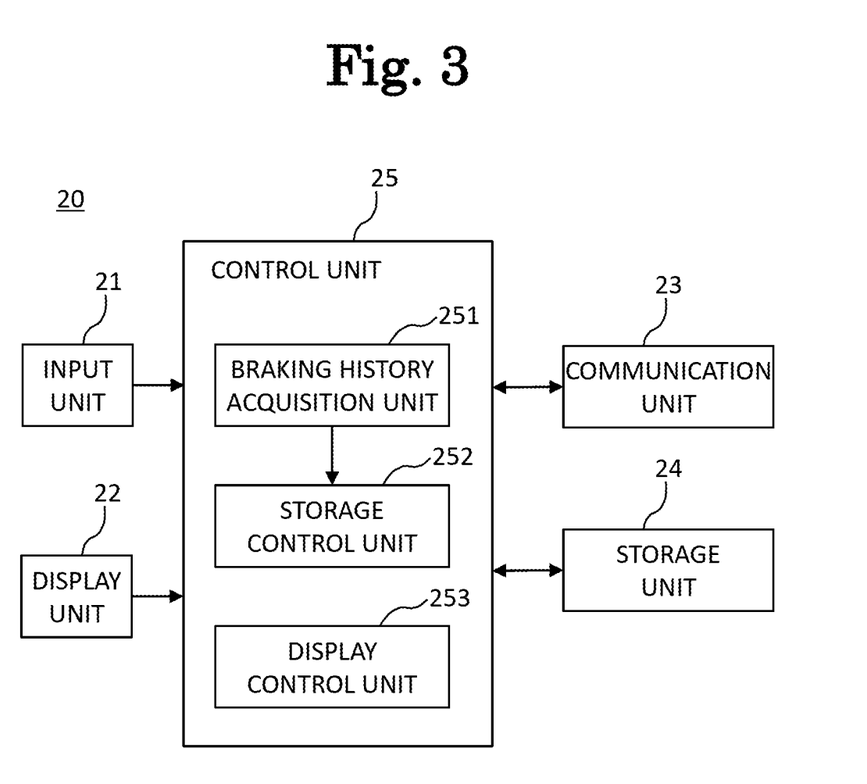
FIG. 3 is a diagram illustrating the configuration of a management device according to the embodiment.

Next, the configuration of the management device 20 will be described. FIG. 3 is a diagram illustrating the configuration of the management device 20 according to the present embodiment.

The management device 20 is a computer, and includes an input unit 21, a display unit 22, a communication unit 23, a storage unit 24, and a control unit 25.

The input unit 21 is, for example, a keyboard or a mouse. The input unit 21 receives an operation input from an operator of the management device 20.

The display unit 22 is configured of, for example, a liquid crystal display or the like. The display unit 22 displays a map, for example, according to the control of the control unit 25.

The communication unit 23 communicates with the vehicle control device 10 or an external server via various communication networks such as a mobile phone communication network.

The storage unit 24 is, for example, a ROM, a RAM, or a hard disk. The storage unit 24 stores various programs for enabling the control unit 25 to function. The storage unit 24 stores display control programs for enabling the control unit 25 to function as a braking history acquisition unit 251, a storage control unit 252, and a display control unit 253. The storage unit 24 stores the automatic braking history information received from the vehicle control device 10.

The control unit 25 is, for example, a CPU. The control unit 25 functions as the braking history acquisition unit 251, the storage control unit 252, and the display control unit 253 by running the display control programs stored in the storage unit 24.

The braking history acquisition unit 251 acquires the automatic braking history information by receiving the automatic braking history information from the vehicle control device 10 via the communication unit 23.

The storage control unit 252 stores, in the storage unit 24, the automatic braking history information acquired by the braking history acquisition unit 251.

The display control unit 253 controls the display unit 22 to display a map in response to a reception of a predetermined operation via the input unit 21. Then, the display control unit 253 displays information indicating a position where the emergency brake is performed on the map displayed on the display unit 22 based on the position information included in the automatic braking history information stored in the storage unit 24.

Specifically, the display control unit 253 specifies position information corresponding to a display range of the map displayed on the display unit 22 among the position information included in the automatic braking history information. Then, the display control unit 253 displays a symbol that indicates an emergency brake is applied at a position on the map corresponding to the specified position information.

Figure 4:
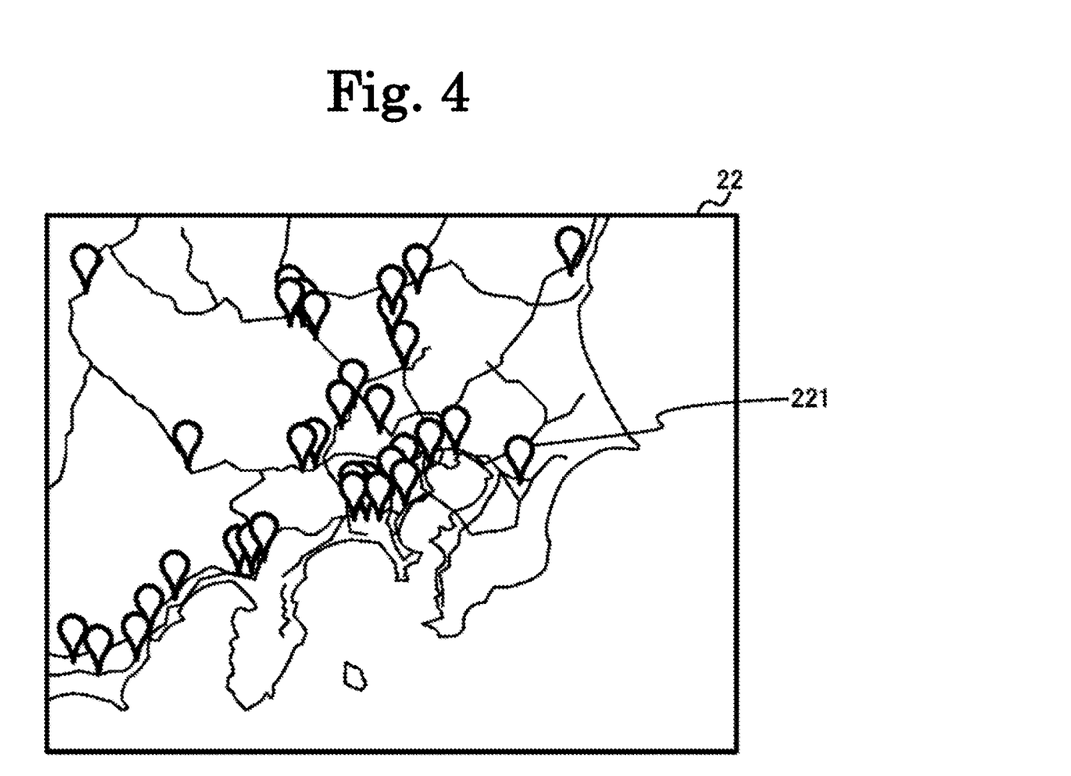
FIG. 4 is a diagram illustrating an example in which a symbol indicating that an emergency brake is applied is displayed on a map.

FIG. 4 is a diagram illustrating an example in which the symbol indicating that an emergency brake is applied is displayed on the map. In FIG. 4, it can be confirmed that a plurality of symbols 221 indicating that an emergency brake is applied are displayed on the map displayed on the display unit 22. The operator of the management device 20 can visually grasp the distribution of the positions where an emergency brake is applied by confirming the map on which the symbols 221 are displayed. Therefore, the manager can grasp a position where an emergency brake tends to be applied frequently.

The display control unit 253 changes the display range of the map by receiving an enlarging operation and a narrowing operation of the map displayed on the display unit 22 via the input unit 21. The display control unit 253 specifies, among the position information included in the automatic braking history information, position information corresponding to the display range of the map after the change of the display range. Then, the display control unit 253 displays the symbol 221 indicating that an emergency brake is applied based on a position indicated by the specified position information on the map after the display range is changed.

Here, the display control unit 253 may display a symbol indicating a position where an emergency brake is applied, based on various information included in the automatic braking history information. For example, the display control unit 253 may specify an emergency brake applied in a case where the time to collision indicated by the information on time to collision is less than a predetermined time which is shorter than the second time, and display the symbol 221 except at the position where the emergency brake is applied. For example, in a case where an emergency brake is applied when the time to collision is less than one second, it is assumed that another vehicle suddenly appears as an obstacle in front of the vehicle V. In this case, it is considered that the driver of the vehicle V is less likely to be at fault, and the emergency brake is accidentally applied. Therefore, the symbol 221 is displayed except at the position where the emergency brake is accidentally applied, so that it is possible to specify a position where an emergency brake is applied in a state where the driver of the vehicle V is likely to be at fault.

The display control unit 253 may display only a symbol indicating a position of an emergency brake applied in a specific vehicle V on the map based on the vehicle identification information included in the automatic braking history information. The display control unit 253 may display only a symbol indicating a position of an emergency brake applied in a specific vehicle type on the map based on the vehicle type included in the automatic braking history information. The display control unit 253 may specify a position where an emergency brake is frequently applied based on the automatic braking history information, and may display a symbol corresponding to the specified position on the map.

In the present embodiment, the display control unit 253 displays the symbol 221 on the map displayed on the display unit 22 provided in the management device 20, but the present disclosure is not limited thereto. For example, the display control unit 253 may display a symbol indicating a position where an emergency brake is performed on a map displayed on a display unit (not shown) provided in the vehicle V, or may display a symbol indicating a position where an emergency brake is performed on a portable terminal (not shown) possessed by the driver of the vehicle V.

For example, the vehicle control device 10 provided in the vehicle V includes a display control unit that controls a display unit provided in the vehicle V to display a map. Then, when the map is displayed on the display unit provided on the vehicle V, the display control unit of the vehicle control device 10 transmits, to the management device 20, an acquisition request that includes the position information of the vehicle V and acquires a position of the symbol. The display control unit 253 of the management device 20 specifies a position of an emergency brake that is applied within a predetermined range from the position indicated by the position information included in the acquisition request, based on the automatic braking history information, and transmits position information indicating the position to the vehicle control device 10.

The display control unit of the vehicle control device 10 displays a symbol indicating that an emergency brake is applied, which is a symbol corresponding to the position indicated by the position information received from the management device 20, on the map displayed on the display unit. In this case, the control unit 16 of the vehicle control device 10 may notify the driver by voice that the vehicle V travels at a position where an emergency brake has been applied in the past. As described above, the driver of the vehicle V can grasp the position where an emergency brake has been applied in the past and drive carefully.

The display control unit 253 of the management device 20 displays a symbol 221 that indicates an emergency brake is applied, but may display not only the symbol indicating that an emergency brake is applied, but also a symbol indicating that an alarm brake is applied. However, when only displaying the symbol 221 indicating that an emergency brake is applied, only important information is displayed, so that information with excellent visibility can be provided.

[Effects according to Present Embodiment]

As described above, the vehicle control device 10 of the present embodiment stores, in the storage unit 24 of the management device 20, the automatic braking history information including the position information acquired when the brake control of the vehicle V is performed by the braking control unit 161. Therefore, the operator of the management device 20 or the driver of the vehicle V can grasp the position where a pre-crash brake has been applied in the past based on the automatic braking history information.

Further, the management device 20 displays the symbol 221 indicating a position where a pre-crash brake is applied on the map displayed on the display unit 22 provided in the management device 20 based on the position information included in the automatic braking history information stored in the storage unit 24. Therefore, the operator of the management device 20 can easily grasp the position where a pre-crash brake has been applied in the past by checking the symbol 221 displayed on the map.

The technical scope of the present disclosure is not limited to the scope described in the above embodiment. It is apparent to those skilled in the art that various modifications or improvements may be added to the above embodiment. It is also apparent from description of the scope of claims that an embodiment with such alterations or improvements may be included in the technical scope of the present disclosure.

For example, in the above embodiment, the vehicle control device 10 stores the automatic braking history information in the storage unit 24 of the management device 20, but the present invention is not limited thereto. For example, the vehicle control device 10 may store the automatic braking history information in the storage unit 14 of its own device. Then, the vehicle control device 10 may further include a display control unit that displays a symbol indicating a position where a pre-crash brake has been applied in the past on a map displayed on the display unit provided in the vehicle control device 10 based on the position information included in the automatic braking history information stored in the storage unit 14.

The present application is based on Japanese Patent Application No. 2017-010239 filed on Jan. 24, 2017, contents of which are incorporated herein as reference.

INDUSTRIAL APPLICABILITY

The vehicle control device and management system of the present disclosure is useful in terms of grasping a position where an automatic brake is performed.

LIST OF REFERENCE NUMERALS 10 vehicle control device
11 obstacle detection sensor
12 speed sensor
13 communication unit
14 storage unit
15 braking unit
16 control unit
161 braking control unit
162 acquisition unit
163 storage control unit
20 management device
21 input unit
22 display unit 23 communication unit
24 storage unit
25 control unit
251 braking history acquisition unit
252 storage control unit
253 display control unit
V vehicle

The invention claimed is:
1. A vehicle control device comprising:
a brake provided on a wheel of the vehicle, the brake configured to apply a braking force to the wheel to brake a vehicle;
an obstacle detection sensor configured to detect an obstacle in front of the vehicle and calculate a time to collision indicating a time until the vehicle collides with the obstacle;
a memory configured to store a program; and
a central processing unit (CPU) coupled to the memory, the brake, and the obstacle detection sensor, the CPU configured to execute the program stored in the memory to:
control braking of the vehicle by the brake based on a detection condition of the obstacle;
acquire position information indicating a position of the vehicle;
store, in a storage unit, braking history information that includes the position information acquired when braking the vehicle by the brake under control of the CPU and information indicating the time to collision calculated when braking the vehicle is performed by the brake under control of the CPU; and
determine whether or not to display information indicating a position where braking the vehicle is performed by the brake under control of the CPU on a map, displayed on a display based on the position information and the time to collision included in the braking history information that is stored in the storage unit,
wherein the CPU is configured not to display information indicating a position where braking the vehicle is performed by the brake under control of the CPU when the time to collision is less than a predetermined time on the map, and is configured to display information indicating a position where braking the vehicle is performed by the brake under control of the CPU when the time to collision is equal to or larger than the predetermined time on the map.
2. The vehicle control device according to claim 1, the CPU configured to execute the program to:
communicate, using a communication unit, with an external device including the storage unit,
wherein the CPU is configured to store the braking history information into the storage unit via the communication unit.
3. The vehicle control device according to claim 1, further comprising:
a speed sensor configured to measure a travelling speed of the vehicle,
wherein the CPU is configured to execute the program to store, in the storage unit, the braking history information that further includes information indicating the travelling speed.
4. The vehicle control device according to claim 1, wherein the CPU is configured to execute the program to:
control the brake to apply an alarm brake in a case where the time to collision is less than a first time;
control the brake to apply an emergency brake in a case where the time to collision is less than a second time which is shorter than the first time, and
wherein display information indicating a position where the emergency brake is applied on a map displayed on the display, based on the position information included in the braking history information stored in the storage unit.
5. A management system comprising:
a vehicle control device mounted a vehicle; and
a management device capable of communicating with the vehicle control device,
wherein the management device includes a storage unit,
wherein the vehicle control device includes:
a brake provided on a wheel of the vehicle, the brake configured apply a braking force to brake a vehicle on which the vehicle control device is mounted;
an obstacle detection sensor configured to detect an obstacle in front of the vehicle and calculate a time to collision indicating a time until the vehicle collides with the obstacle;
a memory configured to store a program; and
a central processing unit (CPU) coupled to the memory, the brake, and the obstacle detection sensor, the CPU configured to execute the program stored in the memory to:
control braking of the vehicle by the brake based on a detection condition of the obstacle;
acquire position information indicating a position of the vehicle;
store, in the storage unit, braking history information that includes the position information acquired when braking of the vehicle is performed by the brake under control of the CPU and information indicating the time to collision calculated when braking the vehicle is performed by the brake under control of the CPU; and
determine whether or not to display information indicating a position where braking the vehicle is performed by the brake under control of the CPU on a map, displayed on a display based on the position information and the time to collision included in the braking history information is stored in the storage unit, and
wherein the CPU is configured not to display information indicating a position where braking the vehicle is performed by the brake under control of the CPU when the time to collision is less than a predetermined time on the map, and is configured to display information indicating a position where braking the vehicle is performed by the brake under control of the CPU when the time to collision is equal to or larger than the predetermined time on the map.
6. The management system according to claim 5, wherein the CPU is configured to execute the program to:
control the brake to apply an alarm brake in a case where the time to collision is less than a first time; and
control the brake to apply an emergency brake in a case where the time to collision is less than a second time which is shorter than the first time, and
wherein the management device is configured to display information indicating a position where the emergency brake is applied on a map displayed on the display provided in the vehicle or the management device, based on the position information included in the braking history information stored in the storage unit.

* * * * *